United States Patent [19]

Rocton

[11] 4,253,729
[45] Mar. 3, 1981

[54] SEALED CONNECTION BETWEEN AN OPTICAL FIBRE CABLE AND A SUBMERGED HOUSING

[75] Inventor: Lucien Rocton, Malakoff, France

[73] Assignee: Compagnie Industrielle des Telecommunications Cit-Alcatel, Paris, France

[21] Appl. No.: 63,962

[22] Filed: Aug. 6, 1979

[30] Foreign Application Priority Data

Aug. 11, 1978 [FR] France ................... 78 23718

[51] Int. Cl.³ .............................................. G02B 5/14
[52] U.S. Cl. .................... 350/96.20; 174/70 S
[58] Field of Search ............... 350/96.20, 96.21, 96.22, 350/96.23; 174/70 S

[56] References Cited

U.S. PATENT DOCUMENTS

| | | | |
|---|---|---|---|
| 2,567,036 | 9/1951 | Shannon | 350/96.20 X |
| 2,945,914 | 7/1960 | Aamodt | 174/70 S X |
| 3,082,291 | 3/1963 | Parkinson et al. | 174/70 S X |
| 3,880,452 | 4/1975 | Fields | 350/96.21 X |
| 4,073,050 | 2/1978 | Kloots | 350/96.20 X |
| 4,172,212 | 10/1979 | Heinzer | 174/70 S X |
| 4,217,028 | 8/1980 | Reh et al. | 350/96.20 |

FOREIGN PATENT DOCUMENTS

| | | | |
|---|---|---|---|
| 1177310 | 4/1959 | France . | |
| 2290099 | 5/1976 | France . | |
| 2387517 | 11/1978 | France | 350/96.20 |
| 735399 | 8/1955 | United Kingdom | 174/70 S |
| 2000390 | 1/1979 | United Kingdom | 350/96.23 |

*Primary Examiner*—John K. Corbin
*Assistant Examiner*—John D. Lee
*Attorney, Agent, or Firm*—Roland Plottel

[57] ABSTRACT

The invention relates to a sealed connection between an optical fibre line cable (C) and an electronics-containing submerged housing (11) the connection being via an access provided in a cover (1) which closes the housing. The connection is constituted by a length of optical fibre cable called the lead-in cable (2), installed on the electronics block and including thereon a notched hollow tube (7) which surrounds the cable together with connection ring (10) which extends the notched part towards the inside of the housing; one end of which is fixed to the notched part (7), the other forming a stop for the cover, the connecting ring co-operating with means (19) for locking the cover against the stop, said connection including outer casings (16, 23, 22) which provide continuity of the seal between the lead-in cable and the housing of the repeater.

7 Claims, 3 Drawing Figures

SEALED CONNECTION BETWEEN AN OPTICAL FIBRE CABLE AND A SUBMERGED HOUSING

The present invention relates to a sealed connection between an optical fibre cable, called hereinafter the line cable, and a submerged housing, in particular a repeater or an equalizer.

The invention applies to underwater telecommunications links, in particular in the case of an underwater repeater which includes a metal housing, whether isolated or not from sea water, and formed by a cylinder which is closed at each end by a cover. The electronic equipment, hereinafter called the electronics block, is placed inside the housing and operates in a low pressure environment.

The aim of the invention is to connect the line cable to the repeater via an access provided in each cover of the housing, while providing sealing at the access.

The invention provides a sealed connection between an optical fibre cable, the "line cable", and an underwater housing in the form of a cylinder closed at each end by a respective cover and containing an electronics block, the connection being made through one of the covers via an access provided therein, and comprising:

a single length of optical fibre cable, "the lead-in cable" connected at one end to the line cable and at the other end to the electronics block; and a hollow member threaded on the lead-in cable where it passes through the access in the cover, the outside end of the hollow member and an adjacent length of the lead-in cable being embedded in a first sealed casing; the inside end of the hollow member forming a stop for the cover when the cover is in the closed position and being connected by annular bellows to an adjacent end wall of the electronics block; and an intermediate position of the hollow member being engaged with locking means for locking the lead-in cable in the access through the cover when the cover is in the closed position, sealing means being provided at the access which sealing means are held in position by said locking means.

The invention also provides a method of providing a sealed connection between an optical fibre underwater cable and an underwater device comprising an electronics block housed in a sealed housing, the method comprising the steps of: electrically and mechanically connecting a length of lead-in optical fibre cable to the electronics block said length including means for sealing it to a cover of the housing and for locking it therein; performing final performance tests on said electronics block via the lead-in cable and making any adjustments that may be required while said electronics block is still accessible; and then threading the lead-in cable through an access in the cover of the housing and sealing the cover to the housing and to the lead-in cable.

Therefore, in accordance with the invention, the electronics block is equipped with its arrangement for connecting it to the line cable, the connecting arrangement itself being equipped with means for sealing the housing at the access in the cover. The installation of the connecting arrangement on the electronics block advantageously allows final measurements and adjustments to be made from the end of the lead-in cable for connection to the line cable, before the electronics block is closed in the housing, i.e. while it is still accessible.

Two embodiments of the invention are described by way of example with reference to the accompanying drawings, in which.

Figure 1:
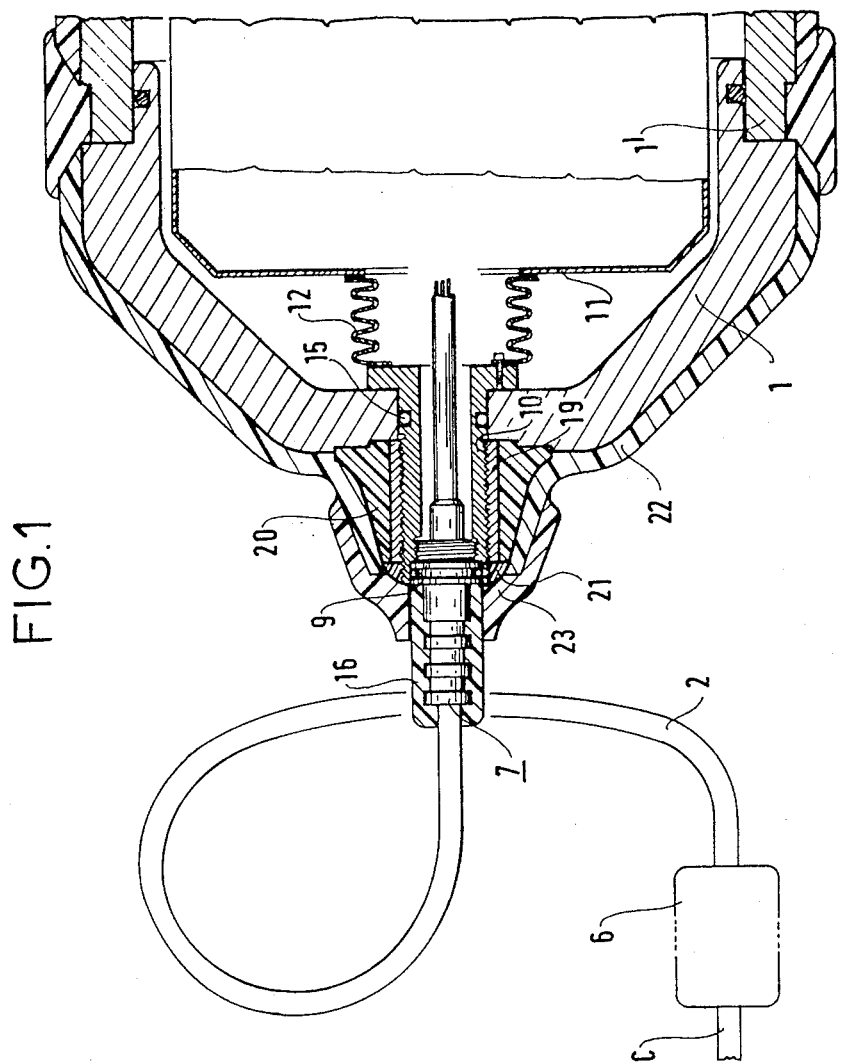
FIG. 1 illustrates a connection in accordance with the invention between a line cable and a repeater which is isolated from sea water.
Figure 2:
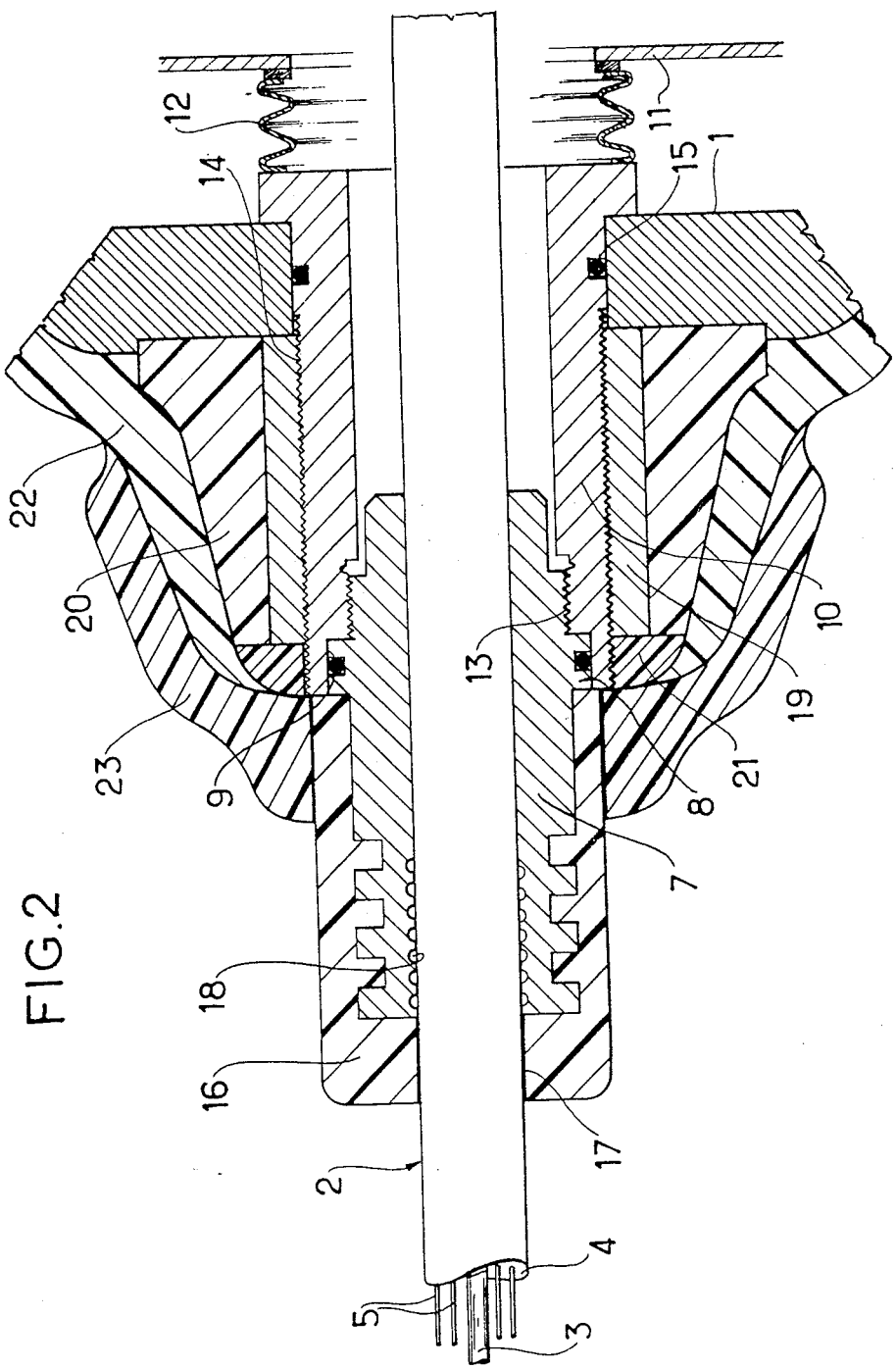
FIG. 2 is a cross-section on a larger scale than FIG. 1 of a portion of the connection of FIG. 1, at the repeater end.

In FIG. 1 and FIG. 2, the repeater is illustrated simply by a portion of the repeater housing formed by a cylinder which is closed at both ends by respective covers. The only one of the covers shown is referenced 1 and the cylinder is referenced 1'. The cover 1 is provided with a passage which gives access to an electronics block normally situated in the housing.

The electronics block is not illustrated; it is installed on a frame of which only an end plate 11 is shown. In this case, the repeater is isolated from sea water, as will be seen hereinafter.

The connection between the repeater and an optical fibre cable C, called the line cable, is constituted by a length of optical fibre cable 2, called the lead-in cable, which both connects the line cable C to the electronics block and ensures that the housing is sealed at the access provided in its cover. In the lead-in cable, 3 designates a central strength member which can be used as a conductor for supplying electricity to the electronics block, and 4 designates a polyethylene sheath which surrounds the central strength member 3 and in which optical fibres 5 are embedded.

At the line cable end, the lead-in cable is connected to the line cable by a connector which connects the central strength member of the line cable to the central strength member of the lead-in cable and connects the optical fibres of the line cable to the fibres of the lead-in cable. This connector, of known type, is schematically shown at 6.

At the repeater end, the lead-in cable is equipped with means which connect it mechanically to the end plate 11 and to the cover 1 and which seal the housing. For this purpose, the lead-in cable is threaded through a metal tube 7 installed on the sheath 4 of the cable. The tube 7 is notched, i.e. its axial cross-section is crenellated, and it has a collar 8 around an intermediate portion thereof. A circular groove is provided in the collar 8; a seal ring 9 is recessed in the groove. A brass connecting ring 10 extends the notched tube 7 towards the inside of the housing of the repeater. Inside the repeater housing, annular re-aligning bellows 12 connect the ring 10 to the plate 11. The ring 10 is fixed on the notched tube on a portion near the collar 8; here, the ring 10 is tapped, the tapping corresponding to a thread of this portion of the notched tube. The tapping and the thread are referenced 13. One end of the ring 10 covers the collar 8 and holds the seal ring 9. The other end of the ring forms a stop for the inner rim of the access hole of the cover 1 when the latter is in position on the lead-in cable and closes the housing of the repeater. The annular bellows 12 are fixed on the stop. The ring 10 has a thread referenced 14. It has a circular groove perpendicular to the access hole in the cover 1. The groove contains a seal ring 15. A polyethylene casing 16 is moulded round the sheath 4 and the other portion of the notched part 7, up to the collar 8. The casing 16 is welded on the sheath 4 at 17. It is fast to the whole portion of the notched tube 7 up to the collar 8 and connects the lead-in cable to the notched tube in a sealed manner. The notched tube 7 has anti-creep ribs 18 inside it, on its end which is held in the casing 16.

When the electronics block is installed in the housing, the housing is closed by putting the cover 1 on the lead-in cable which is originally connected to the electronics block and equipped as described hereinabove. The diameter of the access hole of the cover is just sufficient to allow the cover 1 to slide along the lead-in cable.

With a view to locking the lead-in cable to the cover while sealing the housing perfectly, the access hole in the cover is fitted on its side outside the repeater, with a funnel-shaped, i.e. frusto-conical hollow socket 20 made of epoxy resin. The socket 20 is moulded on the cover 1, near the outer rim of the access hole in the cover. The diameter of the socket is greater than that of the ring 10 which it contains when the cover is positioned. A brass nut 19 screwed onto the thread 14 of the ring 10 is inserted therein, locking the ring 10 in the socket.

The funnel formed in the socket 20 is closed by a ring 21 made of thermally insulating material moulded on the connecting ring 10, perpendicularly to the collar 8 of the tube 7 and on the socket 20. The locking ring 21 holds the nut 19 which is installed on the connecting ring 10 inside the socket 20. The socket 20 and the ring 21 act as a support for an outer casing 22 of the housing of the repeater. Said casing is made of polyethylene and is formed by moulding over and isolates the housing from sea water. A hood 23 also made of polyethylene surrounds the adjacent portions of the outer casing 22 and of the casing 16 which holds a portion of the notched tube 7 and connects them together. The hood 23 is formed by moulding over. It locks the lead-in cable finally on the cover 1 of the repeater housing and complements the sealing provided by the seals 9 and 15 while providing, with the casing 16 and the casing 22, continuity of the sealing coatings.

Figure 3:
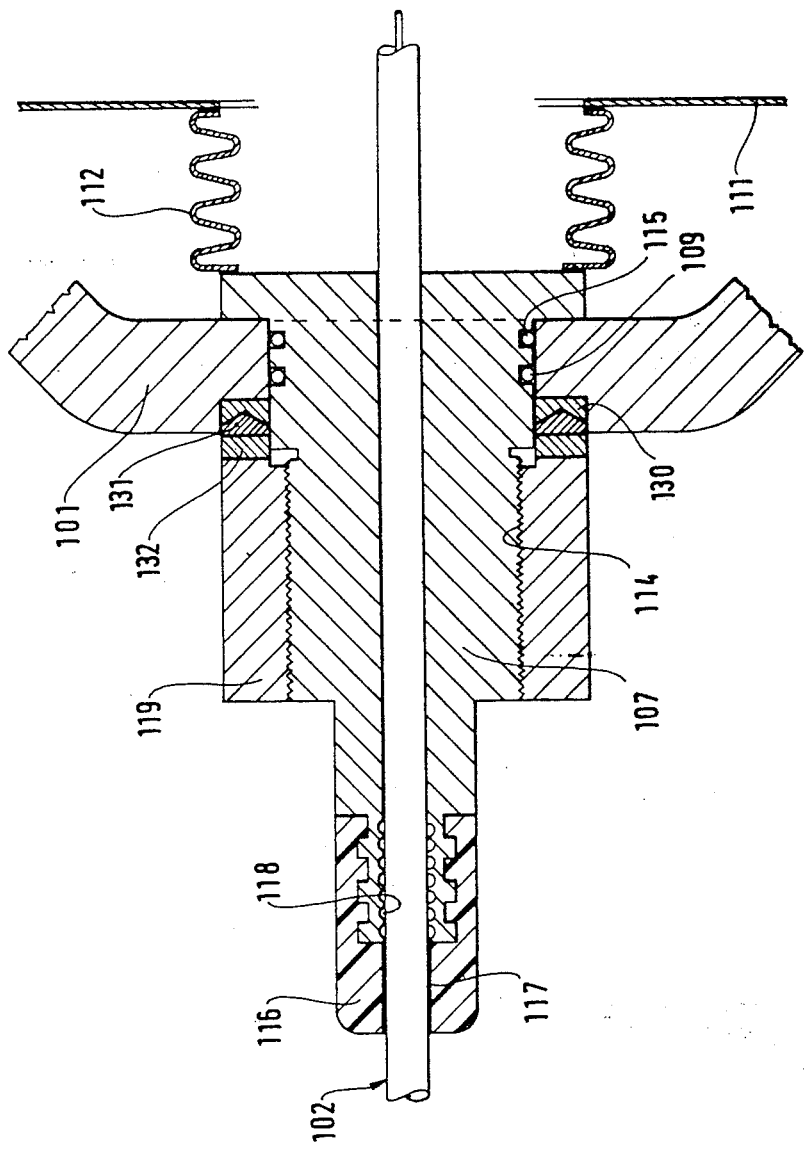
FIG. 3 is a cross-section of a second connection in accordance with the invention, also at the repeater in the case of a repeater which is not isolated from sea water.

FIG. 3 illustrates a variant of the connection for a repeater that is not isolated from sea water. Only the repeater end components of the connection are illustrated in cross-section, since the line cable components remain identical to those illustrated in FIG. 1.

In FIG. 3, the connection is likewise constituted by a single section of optical fibre lead-in cable 102 directly connected to the electronics block and identical to the lead-in cable 2 of FIGS. 1 and 2. The repeater is illustrated in a similar way to FIG. 2: there is shown a portion of the cover 101 of the housing which is here directly in contact with sea water; the housing contains the electronics block whose side plate 111 only is illustrated.

At the repeater end, the lead-in cable 102 is equipped with a hollow notched tube 107 which surrounds the lead-in cable 102 and extends from the outside to the inside of the housing at the cover 101. The outer surface of the notched tube 107 has regular notches on its end portion and a succession of stages of increasing diameters, the last stage inside the housing forming a shoulder and acting as a stop for the cover 101 in the housing closed position.

A casing 116 of polyethylene is moulded over the end portion of the part 107 which has regular notches and over the lead-in cable 102 to provide a sealed connection of the part 107 to the lead-in cable. The casing 116 is welded on the lead-in cable at 117; it holds the corresponding end portion of the notched tube 107 which has anti-creep ribs 118 inside it.

Inside the repeater, annular re-aligning bellows 112 connect the end of the notched tube 107 to the plate 111 of the electronics block. The bellows 112 are fixed firstly to the front surface of the end shoulder of the part 107 and secondly to the plate 111 which acts as a support for the various circuits of the electronics block.

On the intermediate portion, the notched tube 107 has two seal rings 109 and 115, each of which is recessed in a circular groove formed in the notched tube, on the stage before the end shoulder. Therefore, these seals 109 and 115 provide sealing at the access hole in the cover 101; they are held in their respective grooves by the wall which delimits the access hole in the cover.

When the housing is closed, the cover 101 is slid along the lead-in cable and the notched tube 107, the diameter of the access hole in the cover being just sufficient for this operation. In the housing closed position, the cover 101 abuts against the end shoulder of the tube 107. A nut 119 screwed into the second stage at the periphery of the tube 107 locks the cover to keep the housing closed. The second stage is threaded for the purpose, as shown at 114. The nut 119 locks the cover 101 in the closed position; it also makes the connecting device integral with the cover by holding the cover abutted against the shoulder of the tube 107.

For proper tightening of the equipped lead-in cable in the cover, the outer edge of the access hole in the cover 101 is appropriately equipped. The outer edge of the access has a circular clearance which is open towards the outside of the housing and towards the inside of the access. The clearance contains: a toroidal part 130 made of soft metal, e.g. lead, which bears against the bottom of the clearance and has a V-shaped cross-section open towards the outside of the housing, an annular middle part 131 made of hard metal, e.g. steel, like the cover, and having a V-shaped axial cross-section to fit into the part 130 and lastly, a thrust washer 132 which bears against the middle part 131. The washer 132 extends beyond the clearance with respect to the outer surface of the cover. Therefore, when the nut 119 is tightened, it presses against the washer 132 which transmits the clamping force to the annular middle part 131 which in its turn crushes the soft metal part 130. The assembly is therefore a self-tightening one.

Thus, the electronics block is directly equipped with its lead-in cable ready to be connected to the line cable. The lead-in cable and the cover are themselves equipped with means for locking the lead-in cable in the cover while sealing the housing at the passage provided through the cover, whose access is appropriately equipped for fitting the lead-in cable to it and which is installed on the lead-in cable to close the repeater housing.

I claim:

1. A sealed connection between an optical fibre cable, the "line cable", and an underwater housing in the form of a cylinder closed at each end by a respective cover and containing an electronics block, the connection being made through one of the covers via an access provided therein, and comprising:

a single length of optical fibre cable, "the lead-in cable" connected at one end to the line cable and at the other end to the electronics block; and a hollow member threaded on the lead-in cable where it passes through the access in the cover, the outside end of the hollow member and an adjacent length of the lead in cable being embedded in a first sealed casing; the inside end of the hollow member forming a stop for the cover when the cover is in the closed position and being connected by annular bellows to an adjacent end wall of the electronics block; and an intermediate portion of the hollow member being engaged with locking means for locking the lead-in cable in the access through the cover when the cover is in the closed position, sealing means being provided at the access which sealing means are held in position by said locking means.

2. A sealed connection according to claim 1, wherein the said hollow member is constituted by a tube having a notched outer surface, i.e. a surface which is crenellated in axial cross-section, and by a connecting ring which extends the notched tube towards the interior of the housing, the connecting ring being mechanically connected to the notched tube by means interposing a first seal ring between the notched tube and the connecting ring; the connection further including a socket fixed to the cover and extending outwardly the access therethrough, said socket holding the locking means around the connecting ring and trapping a second seal ring between the cover and the connecting ring; the connection being covered by at least one second sealed casing providing together with the first sealed casing continuity of sealing between the lead-in cable and the cover, and constituting, together with the said first and second seal rings, the said sealing means.

3. A sealed connection according to claim 2, wherein the notched tube has a collar with a peripheral groove in which said first seal ring is recessed, the collar being covered by the corresponding end of said connecting ring whose inner surface is staggered correspondingly.

4. A sealed connection according to claim 2, including a closing ring installed on the end of said socket and on the end of said connecting ring where it is connected to the notched tube, said closing ring closing the access through said cover and fixing said means for locking the cover on the connecting ring.

5. A sealed connection according to claim 2 or 3, wherein said locking means are constituted by a nut installed on the connecting ring which is threaded to co-operate therewith.

6. A sealed connection according to claim 1, wherein said hollow member is constituted by a single tube having a notched outer surface which surface also has several stages of increasing diameter going from the outside end towards the inside of said housing; the last stage inside said housing forming said stop for said cover, the penultimate stage holding said sealing means between it and the cover, and the antepenultimate stage being threaded and co-operating with a nut to constitute said locking means.

7. A sealed connection according to claim 6, further including a first toroidal part made of soft metal, a second toroidal part made of hard metal which is fitted into the first and a thrust washer between said nut and said second toroidal part to provide self-tightening of said locking means, said parts being recessed in a peripheral clearance of the cover, said clearance being open in the access and towards the outside of the housing.

* * * * *